(12) United States Patent
Justiss et al.

(10) Patent No.: US 7,451,291 B2
(45) Date of Patent: *Nov. 11, 2008

(54) SYSTEM AND METHOD FOR MODE SELECT HANDLING FOR A PARTITIONED MEDIA LIBRARY

(75) Inventors: Steven A. Justiss, Lakeway, TX (US); Linlin Gao, Cedar Park, TX (US)

(73) Assignee: Crossroads Systems, Inc., Austin, TX (US)

( * ) Notice: Subject to any disclaimer, the term of this patent is extended or adjusted under 35 U.S.C. 154(b) by 260 days.

This patent is subject to a terminal disclaimer.

(21) Appl. No.: 11/046,066

(22) Filed: Jan. 28, 2005

(65) Prior Publication Data

US 2006/0170238 A1 Aug. 3, 2006

(51) Int. Cl.
G06F 12/00 (2006.01)
G06F 13/00 (2006.01)
(52) U.S. Cl. .................... 711/203; 711/154; 711/200
(58) Field of Classification Search .............. 711/100, 711/153, 154, 200
See application file for complete search history.

(56) References Cited

U.S. PATENT DOCUMENTS

| | | | | |
|---|---|---|---|---|
| 4,104,718 A | * | 8/1978 | Poublan et al. ............ 707/8 |
| 4,430,701 A | * | 2/1984 | Christian et al. .......... 711/119 |
| 4,945,428 A | | 7/1990 | Waldo |
| 5,214,768 A | | 5/1993 | Martin et al. |
| 5,455,926 A | | 10/1995 | Keele et al. |
| 5,506,986 A | | 4/1996 | Healy |
| 5,546,315 A | | 8/1996 | Kleinschnitz |
| 5,546,557 A | | 8/1996 | Allen et al. |
| 5,548,521 A | | 8/1996 | Krayer et al. |
| 5,568,629 A | | 10/1996 | Gentry et al. |
| 5,592,638 A | | 1/1997 | Onodera |
| 5,598,385 A | | 1/1997 | Mizukami et al. |
| 5,612,934 A | | 3/1997 | Dang et al. |
| 5,740,061 A | | 4/1998 | Dewey et al. |
| 5,761,503 A | | 6/1998 | Fisher |
| 5,764,615 A | | 6/1998 | Ware et al. |
| 5,790,852 A | | 8/1998 | Salm |

(Continued)

FOREIGN PATENT DOCUMENTS

EP 1156408 A1 11/2001

(Continued)

OTHER PUBLICATIONS

International Search Report for PCT/US03/35824, Dec. 6, 2004.

(Continued)

*Primary Examiner*—Tuan V. Thai
(74) *Attorney, Agent, or Firm*—Sprinkle IP Law Group (57) ABSTRACT

One embodiment of the present invention includes a method for handling status commands direct to a partitioned media library that comprises establishing a set of initial logical element addresses for a set of physical element addresses with each initial logical element address corresponding to a physical element address of an element assigned to a library partition, assigning a set of new logical element addresses for the set of physical element addresses in response to a command from a host application (e.g., a MODE SELECT command) and determining a corresponding physical address for a received element address based on the set of new logical element addresses.

18 Claims, 7 Drawing Sheets

U.S. PATENT DOCUMENTS

| | | | |
|---|---|---|---|
| 5,870,732 | A | 2/1999 | Fisher et al. |
| 5,892,633 | A | 4/1999 | Ayres et al. |
| 5,914,919 | A | 6/1999 | Fosler et al. |
| 5,959,866 | A | 9/1999 | Hanaoka et al. |
| 5,963,971 | A | 10/1999 | Fosler et al. |
| 5,971,281 | A | 10/1999 | Frary et al. |
| 6,031,798 | A | 2/2000 | James et al. |
| 6,041,329 | A | 3/2000 | Kishi |
| 6,041,381 | A | 3/2000 | Hoese |
| 6,044,442 | A | 3/2000 | Jesionowski |
| 6,052,341 | A | 4/2000 | Bingham et al. |
| 6,058,494 | A | 5/2000 | Gold et al. |
| 6,085,123 | A | 7/2000 | Baca et al. |
| 6,185,165 | B1 | 2/2001 | Jesionowski et al. |
| 6,327,519 | B1 | 12/2001 | Ostwald et al. |
| 6,327,594 | B1 | 12/2001 | Van Huben et al. |
| 6,328,766 | B1 | 12/2001 | Long |
| 6,336,172 | B1 | 1/2002 | Day, III et al. |
| 6,356,803 | B1 | 3/2002 | Goodman et al. |
| 6,360,232 | B1 | 3/2002 | Brewer et al. |
| 6,374,241 | B1 | 4/2002 | Lamburt et al. |
| 6,385,706 | B1 | 5/2002 | Ofek et al. |
| 6,425,035 | B2 | 7/2002 | Hoese et al. |
| 6,425,059 | B1 | 7/2002 | Basham et al. |
| 6,480,934 | B1 | 11/2002 | Hino et al. |
| 6,487,561 | B1 | 11/2002 | Ofek et al. |
| 6,493,721 | B1 | 12/2002 | Getchius et al. |
| 6,507,883 | B1 | 1/2003 | Bello et al. |
| 6,507,889 | B1 | 1/2003 | Tsurumaki et al. |
| 6,574,641 | B1 | 6/2003 | Dawson et al. |
| 6,604,165 | B1 * | 8/2003 | Terao ............................ 711/5 |
| 6,665,786 | B2 | 12/2003 | McMichael et al. |
| 6,675,260 | B2 | 1/2004 | Torrey et al. |
| 6,715,031 | B2 | 3/2004 | Camble et al. |
| 6,725,352 | B2 | 4/2004 | Goodman et al. |
| 6,725,394 | B1 | 4/2004 | Bolt |
| 6,738,885 | B1 | 5/2004 | Zhang et al. |
| 6,763,419 | B2 | 7/2004 | Hoese et al. |
| 6,772,231 | B2 | 8/2004 | Reuter et al. |
| 6,804,753 | B1 | 10/2004 | Moody, II et al. |
| 6,839,824 | B2 | 1/2005 | Camble et al. |
| 6,845,431 | B2 | 1/2005 | Camble et al. |
| 6,950,723 | B2 * | 9/2005 | Gallo et al. .................. 700/214 |
| 7,136,988 | B2 * | 11/2006 | Gallo .......................... 711/217 |
| 7,199,809 | B1 | 4/2007 | Lacy et al. |
| 2001/0020197 | A1 | 9/2001 | Nakano et al. |
| 2002/0004883 | A1 | 1/2002 | Nguyen et al. |
| 2002/0019863 | A1 | 2/2002 | Reuter et al. |
| 2002/0144048 | A1 | 10/2002 | Bolt |
| 2002/0169521 | A1 | 11/2002 | Goodman et al. |
| 2002/0188592 | A1 | 12/2002 | Leonhardt et al. |
| 2002/0199077 | A1 | 12/2002 | Goodman et al. |
| 2003/0014585 | A1 | 1/2003 | Ji |
| 2003/0070053 | A1 | 4/2003 | Gallo et al. |
| 2003/0084240 | A1 | 5/2003 | Torrey et al. |
| 2003/0126360 | A1 | 7/2003 | Camble et al. |
| 2003/0126361 | A1 | 7/2003 | Slater et al. |
| 2003/0126362 | A1 | 7/2003 | Camble et al. |
| 2003/0126395 | A1 | 7/2003 | Camble et al. |
| 2003/0126396 | A1 | 7/2003 | Camble et al. |
| 2003/0126460 | A1 | 7/2003 | Camble et al. |
| 2003/0131157 | A1 | 7/2003 | Hoese et al. |
| 2003/0131253 | A1 | 7/2003 | Martin et al. |
| 2003/0135580 | A1 | 7/2003 | Camble et al. |
| 2003/0212873 | A1 | 11/2003 | Lee et al. |
| 2003/0221054 | A1 | 11/2003 | Wu |
| 2004/0044828 | A1 | 3/2004 | Gibble et al. |
| 2004/0044871 | A1 | 3/2004 | Weber et al. |
| 2004/0054838 | A1 * | 3/2004 | Hoese et al. ................. 710/305 |
| 2004/0064641 | A1 | 4/2004 | Kodama |
| 2004/0088513 | A1 | 5/2004 | Biessener et al. |
| 2004/0107300 | A1 | 6/2004 | Padmanabhan et al. |
| 2004/0111580 | A1 | 6/2004 | Weber et al. |
| 2004/0133915 | A1 | 7/2004 | Moody, II et al. |
| 2004/0139094 | A1 | 7/2004 | Tyndall et al. |
| 2004/0139240 | A1 | 7/2004 | DiCorpo et al. |
| 2004/0139260 | A1 | 7/2004 | Steinmetz et al. |
| 2004/0148460 | A1 | 7/2004 | Steinmetz et al. |
| 2004/0148461 | A1 | 7/2004 | Steinmetz et al. |
| 2006/0069844 | A1 * | 3/2006 | Gallo et al. .................... 711/4 |
| 2006/0149919 | A1 * | 7/2006 | Arizpe et al. ................ 711/206 |

FOREIGN PATENT DOCUMENTS

| | | |
|---|---|---|
| WO | WO02/27463 A2 | 4/2002 |
| WO | WO03/104971 A1 | 12/2003 |

OTHER PUBLICATIONS

International Search Report for PCT/US 03/35822, Dec. 6, 2004.

Working Draft NCITS T10 Project 999D, "Information Technology—SCSI-3 Medium Changer Commands (SMC)", pp. 1-68, Mar. 4, 1998.

Working Draft INCITS T10 Project 1383D, Information Technology—SCSI Media Changer commands—2 (SMC-2), pp. i-x and 1-58, Nov. 18, 2003.

U.S. Patent Office Official Action issued Jun. 28, 2007 in U.S. Appl. No. 11/045,443, Justiss et al.

U.S. Patent Office Official Action issued in U.S. Appl. No. 11/046,019, Justiss et al, May 9, 2007.

Office Action dated Aug. 29, 2007 issued in U.S. Appl. No. 10/880,360.

Office Action dated Feb. 1, 2008 issued in U.S. Appl. No. 10/704,265.

Office Action dated Jan. 28, 2008 issued in U.S. Appl. No. 11/046,019.

CNET Glossary: Terms for the techie: controller, [online] pp. 1-2, downloaded from internet www.cnet.com/4520-6029_1-6040342-1.html?tag=txt retrived on Jul. 27, 2007.

CNET Glossary: Terms for the techie: crawler, [online] pp. 1-2, downloaded from internet www.cnet.com/4520-6029_1-6040342-1.html?tag=txt retrived on Jul. 27, 2007.

Griswold, "Storage Topologies", [online] pp. 1-8, downloaded from internet www.crossroads.com/Library/CollateralDownloads.asp on Jul. 27, 2007, Dec. 2002.

SGI - OpenVault Glossary of Terms, [online] pp. 1-8, downloaded from Internet: www.sgi.com/products/software/openvault/glossary/html on Jul. 27, 2007, 1993-2007, source SGI.

Tape Solutions: *Router* vs. *Native Fibre Channel*, Crossroads White Paper, pp. 1-7, Doc. Version #001, Crossroads Systems, Inc., Apr. 29, 2002.

* cited by examiner

| BIT BYTE | 7 | 6 | 5 | 4 | 3 | 2 | 1 | 0 |
|---|---|---|---|---|---|---|---|---|
| 0 | PS | RSVD | \multicolumn{6}{c}{PAGE CODE (1Dh)} | | | | | |
| 1 | \multicolumn{8}{c}{PARAMETER LIST LENGTH} | | | | | | | |
| 2–3 | \multicolumn{8}{c}{FIRST MEDIUM TRANSPORT ELEMENT ADDRESS} | | | | | | | |
| 4–5 | \multicolumn{8}{c}{NUMBER OF MEDIUM TRANSPORT ELEMENTS} | | | | | | | |
| 6–7 | \multicolumn{8}{c}{FIRST STORAGE ELEMENT ADDRESS} | | | | | | | |
| 8–9 | \multicolumn{8}{c}{NUMBER OF STORAGE ELEMENTS} | | | | | | | |
| 10–11 | \multicolumn{8}{c}{FIRST IMPORT/EXPORT ELEMENT ADDRESS} | | | | | | | |
| 12–13 | \multicolumn{8}{c}{NUMBER OF IMPORT/EXPORT ELEMENTS} | | | | | | | |
| 14–15 | \multicolumn{8}{c}{FIRST DATA TRANSFER ELEMENT ADDRESS} | | | | | | | |
| 16–17 | \multicolumn{8}{c}{NUMBER OF DATA TRANSFER ELEMENTS} | | | | | | | |
| 18–19 | \multicolumn{8}{c}{RESERVED} | | | | | | | |

*FIG. 6*

SYSTEM AND METHOD FOR MODE SELECT HANDLING FOR A PARTITIONED MEDIA LIBRARY

TECHNICAL FIELD OF THE INVENTION

Embodiments of the invention relate generally to partitioned media libraries and more particularly to systems and methods for handling commands directed to a partitioned media library. Even more particularly, embodiments of the present invention relate to handling MODE SELECT commands directed to a partitioned media library.

BACKGROUND

Data represents a significant asset for many entities. Consequently, data loss, whether accidental or caused by malicious activity, can be costly in terms of wasted manpower, loss of goodwill from customers, loss of time and potential legal liability. To ensure proper protection of data for business and legal purposes, many entities back up data to a physical storage media such as magnetic tapes or optical disks. Traditionally, backup would occur at each machine controlled by an entity. As the sophistication of network technology increased, many entities turned to enterprise level backup in which data from multiple machines on a network is backed up to a remote media library. Centralized data backup allows storage problems to be identified at one location and has the advantage of increased efficiency.

One example of a media library commonly used in enterprise backup systems is a magnetic tape library. In a typical magnetic tape library, tapes are contained in cartridges and the tape library contains multiple cartridge slots in which tape cartridges can be stored. The tape cartridges are physically moved between cartridge slots and tape drives by a robot. The robot is controlled by access commands received from the host devices on the network. When specific data is required, the host device determines which cartridge slot contains the tape cartridge that holds the desired data. The host device then transmits a move-medium command to the robot and the robot moves the tape cartridge.

In a SCSI tape library, devices that are part of the library are typically addressed by target number and logical unit numbers ("LUN"). Thus, each drive and media changer of a tape library typically has a target number and LUN. Cartridge slots, on the other hand, are addressed by element addresses that are used by the robot to locate the slots. Because the robot also places tape cartridges in the drives, each drive is also associated with an element number. The robot is also assigned an element address. If multiple tape libraries are connected to a single device (e.g., a Fibre Channel to SCSI routing device), the tape libraries may be further addressed by bus number.

The operation of traditional media libraries leads to problems when multiple hosts attempt to access the media library. For instance, two or more hosts may attempt to access the same cartridge slot at the same time, but for data at different locations on the tape. In this situation, there is a conflict and the tape library system must somehow resolve the issue of which host's access request the system will respond to. The conflict becomes even more apparent when the tape library system has more than one tape drive. The system then has to resolve not only the question of which access request to respond to, but also which tape drive the tape should be loaded into. Therefore, it is desirable to control access to media libraries by multiple hosts in a manner that reduces or prevents conflicts.

Another issue encountered is that many independent software vendor ("ISV") host applications timeout commands such as MODE SENSE commands, INQUIRY commands and LOG SENSE commands and other status commands. If the commands are passed to the media library through an access control device such as a storage routing device, the storage routing device may not be able to forward a command to the media library, receive a response and return the response to the command before the command is timed out by the host application. The issue of timing out commands can become more problematic as the number of hosts issuing commands to the media library increases. Additionally, the ISV application may send commands to the media changer to update information at the media changer. Therefore, it is desirable to have a mechanism to quickly process status commands for a media library that is shared among host applications and to process commands, such as the MODE SELECT command, that are intended to provide information to the media changer.

SUMMARY OF THE INVENTION

Embodiments of the present invention provide a system and method of handling commands directed to a media changer of a physical media library. More particularly, embodiments of the present invention provide a mechanism to update the logical element addresses for a library partition based on a command from a host application.

One embodiment of the present invention includes a method for handling status commands directed to a partitioned media library that comprises establishing a set of initial logical element addresses for a set of physical element addresses with each initial logical element address corresponding to a physical element address of an element assigned to a library partition, assigning a set of new logical element addresses for the set of physical element addresses in response to a command from a host application (e.g., a MODE SELECT command) and determining a corresponding physical address for a received element address based on the set of new logical element addresses.

Another embodiment of the present invention includes a computer program product that comprises a set of computer instructions stored on a computer readable medium. The computer instructions can include instructions executable to establish a set of initial logical element addresses for a set of physical element addresses, assign a set of new logical element addresses for the set of physical element addresses in response to a command from a host application and determine a corresponding physical address for a received element address based on the set of new logical element addresses.

Yet another embodiment of the present invention includes a storage routing device that comprises a first interface to connect to a first data transport medium, a second interface to connect to a second data transport medium, a buffer coupled to the first interface and the second interface to provide a memory workspace for the storage routing device and a processing unit coupled to the first interface, the second interface and the buffer. The processing unit is operable to establish a set of initial logical element addresses for a set of physical element addresses, assign a set of new logical element addresses for the set of physical element addresses in response to a command from a host application and determine a corresponding physical address for a received element address based on the set of new logical element addresses.

Embodiments of the present invention provide an advantage by allowing for handling of MODE SELECT commands from multiple host applications directed to a partitioned media library.

BRIEF DESCRIPTION OF THE FIGURES

A more complete understanding of the present invention and the advantages thereof may be acquired by referring to the following description, taken in conjunction with the accompanying drawings in which like reference numbers indicate like features and wherein.

DETAILED DESCRIPTION

Preferred embodiments of the invention are illustrated in the FIGURES, like numerals being used to refer to like and corresponding parts of the various drawings.

To resolve the problem of controlling access to a media library by multiple hosts, the media library can be partitioned. In partitioned media libraries, a larger media library is presented to hosts as one or more logical media libraries, with each logical media library representing some portion or all of the physical media library. Embodiments of partitioning a media library are described in U.S. Pat. No. 6,804,753, entitled "Partitioned Library", issued Oct. 12, 2004, by Moody et al. and assigned to Crossroads Systems, Inc. of Austin Tex. and U.S. patent application Ser. No. 10/704,265, entitled "System and Method for Controlling Access to Multiple Physical Media Libraries", filed Nov. 7, 2003, by Tyndall et al. and assigned to Crossroads Systems, Inc. of Austin Tex., each of which is fully incorporated by reference herein. In various implementations access control to a partitioned media library can be provided by a single device (e.g., a router or other device) or can be provided by multiple devices (e.g., multiple routers or other devices) in a distributed or centralized manner. One embodiment of centralized access control is described in U.S. patent application Ser. No. 10/880,360, entitled "System and Method for Centralized Partitioned Library Mapping", filed Jun. 29, 2004, by Justiss et al. and assigned to Crossroads Systems, Inc. which is hereby fully incorporated by reference herein. U.S. patent application Ser. No. 10/880,162, entitled "System and Method for Distributed Partitioned Library Mapping", filed Jun. 29, 2004 by Justiss et al. and assigned to Crossroads Systems, Inc., which is hereby fully incorporated by reference herein, describes an embodiment of providing distributed access control to a media library.

In partitioning a media library, the various elements (e.g., storage elements, medium transport elements, import/export elements, data transfer elements) can be assigned logical element addresses by the device that provides access control to the media library. While this can be done in an arbitrary manner, the SCSI-2 and SCSI-3 Media changer Commands ("SMC") specifications (e.g., SMC and SMC-2 specifications), require that element addresses of a given element type be contiguous. Therefore, host applications that wish to access a media library expect to see storage elements listed in contiguous order, data transfer elements listed in contiguous order and so on. U.S. patent application Ser. No. 11/045,443, entitled "Method and System for Presenting Contiguous Element Addresses for a Partitioned Media Library", filed Jan. 28, 2005, to Justiss et al. (the "Contiguous Element Address Application"), which is hereby fully incorporated by reference herein, describes one mechanism for mapping potentially disjoint physical element addresses to logical element addresses.

Host applications can issue a variety of status commands to a media library, including a MODE SENSE command that requests an element address assignment ("EAA") page (i.e., a 0x1Dh page, according to the SMC and SMC-2 standards). The EAA page essentially provides a host application with information about element addresses that are available to the host application. If the physical media library is partitioned, the EAA page returned to the host may contain logical element addresses that are mapped to the physical element addresses of the physical media library. If a host application does not wish to use the elements at the addresses indicated in the EAA page, the host application can issue a MODE SELECT command to select new element addresses. The present invention provides a mechanism to update a library partition to use the element addresses assigned in the MODE SELECT EAA page as the logical element addresses for the library partition. This can be done without reassigning physical elements to the host application that issued the MODE SELECT command. It should be noted that embodiments of the present invention can be applied to the 6-byte MODE SELECT command (i.e., the 15h MODE SELECT command) and the 10-byte MODE SELECT command (i.e., the 55h MODE SELECT command).

Figure 1:
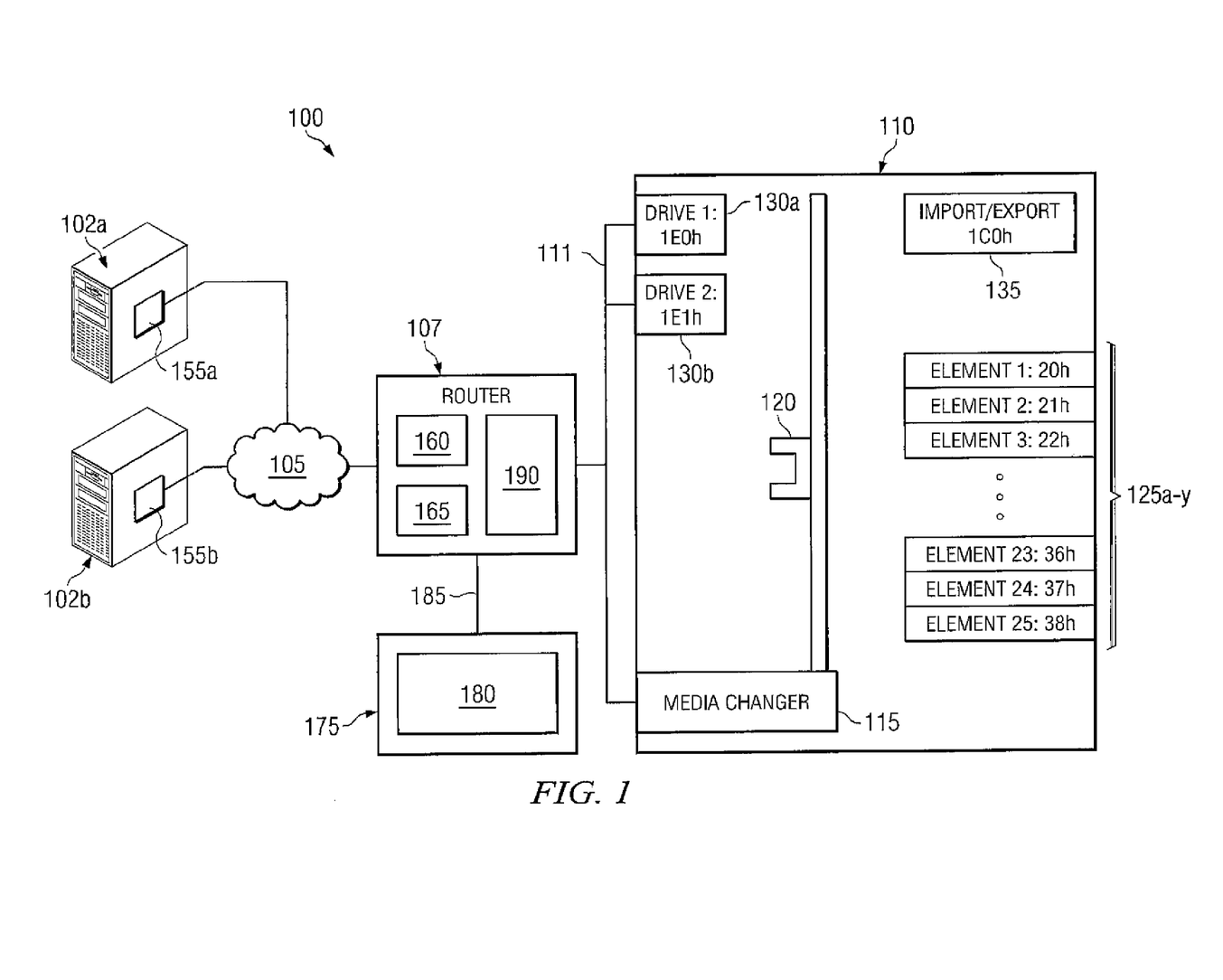
FIG. 1 is a diagrammatic representation of one embodiment of a system in which embodiments of the present invention can be implemented.

FIG. 1 illustrates one embodiment of a system 100 for partitioning a media library in which embodiments of the present invention can be implemented. System 100 includes multiple hosts 102a-102b connected via a first data transport medium 105 (e.g., a storage area network, a LAN, a WAN or other network known in the art) to a controller 107 that controls access to media library 110. Controller 107 can be connected to media library 110 by a second data transport medium 111 that can be the same as or different from first data transport medium 105. Media library 110 is typically a variation of a SCSI media changer, which generally contains at least one media changer 115 with an associated medium transport element 120 (alternatively referred to as a "robot" or "picker"), multiple storage elements 125a-y ("element 1" through "element 25") that can store storage volumes (e.g., tape cartridges, optical disks), and multiple data transfer elements ("drive 1" and "drive 2") 130a and 130b. Media library 110 can also have import/export element 135. The media changer 115 is often a microprocessor based embedded controller that controls medium transport element 120. Medium transport element 120 physically moves storage volumes from one element to another based on element addresses provided to media changer 115. For example, medium transport element 120 can move a storage volume from a storage element to a data transfer element in response to a "MOVE MEDIUM" command.

In a partitioned library, a large, multi-storage element, multi-data transfer element library is represented to applications (independent software vendor ("ISV") applications or other host applications) running on hosts (e.g., applications 155a-155b) as a number of different potentially smaller libraries, each with some allocated number of storage elements, some allocated number of data transfer elements, and some number of allocated import/export elements. Each host may see a different media library that represents some subset (or all) of media library 110. Thus, for example, application 155a running on host 102a may see a different media library than application 155b running on host 102b.

Each element (e.g., storage element, medium transport element, data transfer element, import/export element) of media library 110 has a physical element address used by medium transport element 120 to locate and move tape cartridges (or other media). To comply with SCSI-2 and SCSI-3 standards, element addresses of a particular element type must be contiguous. Data transfer elements can also have a network or bus address (e.g., a LUN, an IP address or other address) and/or target number that is used to forward commands to those elements on a data transport medium (e.g., a bus or network). Similarly, media changer 115 can also have a LUN or other data transport medium address that is used in locating media changer 115 on a data transport medium. The target numbers and data transport medium addresses (e.g., LUNs or other data transport medium address), however, do not have to be contiguous.

As an example of contiguous element addresses within an element type, medium transport element 120 can have an element address of 00h, data storage elements 125a-y can have addresses of 20h-38h, import/export element 135 can have an address of 1C0h and data transfer elements 130a and 130b can have addresses of 1E0h-1E1h. Thus, for each element type, the elements of that type have contiguous physical element addresses. However, the blocks of addresses assigned to an element type do not have to be contiguous with the addresses assigned to other element types.

Information for a media library regarding element addresses is typically discovered through a MODE SENSE page. Table 1 illustrates an example set of MODE SENSE data, as specified in the SMC and SMC-2 standards, for physical media library 110 of the previous example (a diagrammatic representation of one embodiment of a MODE SENSE 0x1Dh page (i.e., an EAA page) is provided in FIG. 6):

TABLE 1

| Element Type | Starting Address | Number of Elements |
| --- | --- | --- |
| Medium Transport Element | 00h | 1 |
| Data Storage Element | 20h | 25 |
| Import/Export Element | 1C0h | 1 |
| Data Transfer Element | 1E0h | 2 |

The physical media library can be partitioned into logical library partitions, which can be configured by an administrator from an administrator computer 175 that runs a configuration program 180 such as StorageWorks Command View by Hewlett-Packard Company of Palo Alto, Calif. The configuration information for the partitions can be passed to controller 107 via an administrative data transport medium 185, such as an Ethernet network, serial connection or other data transport medium. Generally, in partitioning the physical media library, an administrator will assign to each partition some number of data storage elements, data transfer elements, medium transport elements and import/export elements. It should be noted that there may be additional devices involved in configuration. For example, the administrator computer 175 may transmit configuration information to another device (e.g., an embedded Hewlett Packard configuration controller) that, in turn, provides the configuration information to controller 107. In this configuration, the Command View application communicates with the configuration controller and the configuration controller provides the configuration information to controller 107. The Command View application is generally used to only assign the physical elements to each partition.

Table 2 and Table 3 provide an example of two partitions that an administrator can configure:

TABLE 2

Partition 1

Data Transfer Element: Drive #1
Import Export Element 1
Storage Elements: 1-2, 5-6, 9-10, 13-14, 17-18, 21-22 and 25

TABLE 3

Partition 2

Data Transfer Element: Drive #2
Import Export Element 0 (none)
Storage Elements: 3-4, 7-8, 11-12, 15-16, 19-20, 23-24

Access to the physical media library in system 100 is provided by an access controller (e.g., controller 107). Controller 107 can maintain data and logic to perform logical-to-physical mappings for the media library partitions and present the host applications with the appropriate media library partitions. For example, controller 107 can associate Partition 1 (represented at 160) with host 102a and Partition 2 (represented at 165) with host 102b. Consequently, application 155a will see a media library with the elements of Partition 1 and application 155b will see a media library with the elements of Partition 2.

The physical element addresses, according to one embodiment of the present invention, can be mapped to logical element addresses such that the logical element addresses for each element of a particular element type are contiguous. One mechanism for providing such a mapping is provided in U.S. patent application Ser. No. 11/045,443, entitled "Method and System for Presenting Contiguous Element Addresses for a Partitioned Media Library", by Justiss et al., filed Jan. 28, 2005 (the "Contiguous Element Address Application"), which is hereby fully incorporated by reference herein. Other embodiments of the present invention can provide physical-to-logical address mappings according to other schemes. Additionally, LUNs, target numbers and other data transport medium addresses (e.g., bus or network addresses) can be mapped to logical addresses. For example, if media changer element 115 is at physical LUN 0, physical LUN 0 can be mapped to LUN 1 for Partition 1 and LUN 2 for Partition 2. Thus, each library partition can be presented on a different LUN on a fibre channel network. Similarly, the physical LUNs or other data transport medium addresses for drives can be mapped to logical addresses.

A host application can typically issue a number of commands to what it sees as the media changer (e.g., media changer 115) to determine status information for the media library, including a MODE SENSE command, requesting an EAA page. According to one embodiment of the present invention, controller 107 processes these commands as described in U.S. patent application Ser. No. 11/046,019, entitled "System and Method for Handling Status Commands Directed to a Partitioned Media Library", by Justiss et al., filed Jan. 28, 2005, which is hereby fully incorporated by reference herein.

For a MODE SENSE command requesting an EAA page, controller 107 can return the EAA page to the requesting host application that includes logical element addresses for the physical element addresses. As an example, if host application 155*a* sends a MODE SENSE command requesting an EAA page, controller 107 can return the EAA page for Partition 1 containing the MODE SENSE information illustrated in Table 4:

TABLE 4

| Element Type | Starting Address | Number of Elements |
|---|---|---|
| Medium Transport Element | 00h | 1 |
| Data Storage Element | 20h | 13 |
| Import/Export Element | 1C0h | 1 |
| Data Transfer Element | 1E0h | 1 |

In the example of Table 4, the medium transport element of Partition 1 has a base logical element address of 00h, the thirteen data storage elements have a base logical element address of 20h, the import/export element has an assigned a base logical element address of 1C0h and the data transfer elements have a base logical element address of 1E0h. Consequently, host application 155*a* will see a medium transport element at 00h, thirteen data storage elements at 20h-2Ch, an import/export element at 1C0h and a data transfer element at 1E0h.

If, on the other hand, application 155*b* issues a MODE SENSE command for the EAA page, controller 107 can return the EAA page for Partition 2 containing the MODE SENSE information illustrated in Table 5:

TABLE 5

| Element Type | Starting Address | Number of Elements |
|---|---|---|
| Medium Transport Element | 00h | 1 |
| Data Storage Element | 20h | 12 |
| Import/Export Element | 1C0h | 0 |
| Data Transfer Element | 1E0h | 1 |

In this case, host application 155*b* will see a medium transport element at 00h, twelve data storage elements at 20h-2Bh, and a data transfer element at 1E0h. While the import/export element is assigned a base logical address of 1C0h, there are no import/export elements assigned to Partition 2 in this example. It should be noted that the examples of Tables 4 and 5 are provided by way of example and any logical element addresses can be assigned to the elements of a media library for a particular partition. Controller 107 can generate the appropriate EAA page each time a MODE SENSE command requesting an EAA page is received or can maintain the EAA page for each library partition in memory.

Continuing with this example, Table 6 illustrates the corresponding physical and logical addresses for Partition 1 and Partition 2 based on the MODE SENSE data in Table 4 and Table5:

TABLE 6

| Partition | Logical Address | Physical Address |
|---|---|---|
| Partition 1 | 00h | 00h |
| | 20h | 20h |

TABLE 6-continued

| Partition | Logical Address | Physical Address |
|---|---|---|
| | 21h | 21h |
| | 22h | 24h |
| | 23h | 25h |
| | 24h | 28h |
| | 25h | 29h |
| | 26h | 2Ch |
| | 27h | 2Dh |
| | 28h | 30h |
| | 29h | 31h |
| | 2Ah | 34h |
| | 2Bh | 35h |
| | 2Ch | 38h |
| | 1C0h | 1C0h |
| | 1E0h | 1E0h |
| Partition 2 | 00h | 00h |
| | 20h | 22h |
| | 21h | 23h |
| | 22h | 26h |
| | 23h | 27h |
| | 24h | 2Ah |
| | 25h | 2Bh |
| | 26h | 2Eh |
| | 27h | 2Fh |
| | 28h | 32h |
| | 29h | 33h |
| | 2Ah | 36h |
| | 2Bh | 37h |
| | 1C0h | N/A |
| | 1E0h | 1E1h |

A host application may attempt to renumber the elements assigned to it by issuing a MODE SELECT command with a new EAA page. If the EAA page provided by a host application passed through to media changer 115, the element address assignments may conflict. Rather than passing an EAA page provided by a host application to media changer 115, controller 107 can update the mappings between the physical and logical element addresses such that, for the media library partition assigned to the host application, the element addresses provided in the EAA page of the MODE SELECT command are used as the logical addresses for the same corresponding physical addresses.

To this end, controller 107 can maintain a data structure 190 to store the new logical element addresses provided in the EAA page. The data structure, according to one embodiment of the present invention, can contain sufficient information to contain the MODE SELECT EAA page assigned addresses for each of some number of host applications (e.g., 128 or other number depending on memory and processing limitations). Controller 107 maintains the structure, inserting addresses when a MODE SELECT command containing an EAA page is received. Subsequent commands that utilize these element addresses (e.g., READ ELEMENT STATUS, MOVE MEDIUM or other commands) have their assigned element addresses mapped to the corresponding physical element addresses before the commands are forwarded to the physical media changer. Command responses from the physical media changer that contain physical element addresses have the physical element addresses mapped to the appropriate assigned element addresses.

As described in the Contiguous Element Address Application, one mechanism for mapping between physical and logical element addresses for a library partition is to assign a base logical element address for an element type, associate an index of sequential values with the assigned physical addresses for the elements of that element type, and add the index value associated with a physical element address to the base logical address to determine the corresponding logical element address for that physical element address. Using the example of Partition 1 above, if the base logical address for the storage elements is 20h, and an index of sequential values (e.g., 0, 1, 2 . . . Bh, Ch) is associated with the physical element addresses as shown in table 7, the corresponding logical addresses of Table 6 result by adding the index value associated with each physical element address to the base logical element address.

TABLE 7

| Index | Physical Address |
|---|---|
| 0 | 20h |
| 1 | 21h |
| 2 | 24h |
| 3 | 25h |
| 4 | 28h |
| 5 | 29h |
| 6 | 2Ch |
| 7 | 2Dh |
| 8 | 30h |
| 9 | 31h |
| A | 34h |
| B | 35h |
| C | 38h |

If host application 155a issues a MODE SELECT command with a new EAA page, controller 107 can use the element addresses in the EAA page sent by host application 155a for the logical element addresses of Partition 1. If, for example, controller 107 receives the EAA data of Table 8, controller 107 can then use the assigned starting addresses as the base logical addresses for each element type of Partition 1.

TABLE 8

| Element Type | Starting Address | Number of Elements |
|---|---|---|
| Medium Transport Element | 00h | 1 |
| Data Storage Element | 50h | 13 |
| Import/Export Element | 1E0h | 0 |
| Data Transfer Element | 2E0h | 1 |

Because host application 155a provides a starting address of 50h for storage elements, controller 107 can use a base logical address of 50h for the storage elements for the assigned logical element addresses. Using the same index values for the various physical element addresses as shown in Table 7, the assigned logical element addresses for Partition 1 are now: 50h, 51h, 52h, 53h 54h, 55h, 56h, 57h, 58h, 59h, 5Ah, 5Bh and 5Ch (e.g., 50h+0h, 50h+1h . . . 50h+Bh, 50h+Ch). Similarly, the logical element address for the import/export element is now 1E0h and the logical element address for the data transfer element is 2E0h. The physical element address for a particular logical element address can be found by subtracting the assigned base logical element address for the element type (e.g., 50h for storage elements) from a given logical element address (say 59h), and using the result (i.e., 9h) to lookup the physical element address in a lookup table. Using the example of Table 6, the corresponding physical element address for a logical element address 59h for Partition 1 is 31h. For Partition 1, controller 107 will now map between these new logical element addresses based on the EAA page provided by the host application and the corresponding physical element addresses. Moreover, if host application 155a issues a MODE SENSE command requesting an EAA page, controller 107 can return the same data that was in the EAA page provided by host application 155a with the MODE SELECT command.

Controller 107 can be implemented at any point in the command path between host applications and physical media library 110. According to one embodiment of the present invention, controller 107 can be implemented as a storage router with software and/or hardware programming. For purposes of this application a storage router is any device that routes or manages data to and from storage devices, hosts and/or both, including, but not limited to storage area network ("SAN") storage appliances, network attached storage ("NAS") storage appliances, RAID controllers, host bus adapters ("HBA") and other devices that can route/process storage related commands. Each storage router can be, for example, a Fibre Channel to SCSI routing device; Fibre Channel to Fibre Channel routing device; SCSI to SCSI routing device; iSCSI to iSCSI routing device; Fibre Channel to iSCSI routing device; iSCSI to Fibre Channel routing device; iSCSI to SCSI routing device; SCSI to iSCSI routing device; Fibre Channel to Infiniband routing device; Infiniband to Fibre Channel routing device; iSCSI to ATA routing device; ATA to iSCSI routing device; iSCSI to Serial ATA routing device; Serial ATA to iSCSI routing device; Fibre Channel to Serial Attached SCSI routing device; Serial Attached SCSI to Fibre Channel routing device; iSCSI to Serial Attached SCSI routing device; Serial Attached SCSI to iSCSI routing device; Fibre Channel to ATA routing device; ATA to Fibre Channel routing device; Fibre Channel to Serial ATA routing device; Serial ATA to Fibre Channel routing device; Fibre Channel to Serial SCSI Architecture routing device; Serial SCSI Architecture to Fibre Channel routing device; Infiniband to Serial Attached SCSI routing device; Serial Attached SCSI to Infiniband routing device. An example of a storage router includes the Crossroads 10000 storage router, manufactured by Crossroads Systems, Inc. of Austin, Tex.

Figure 2A:
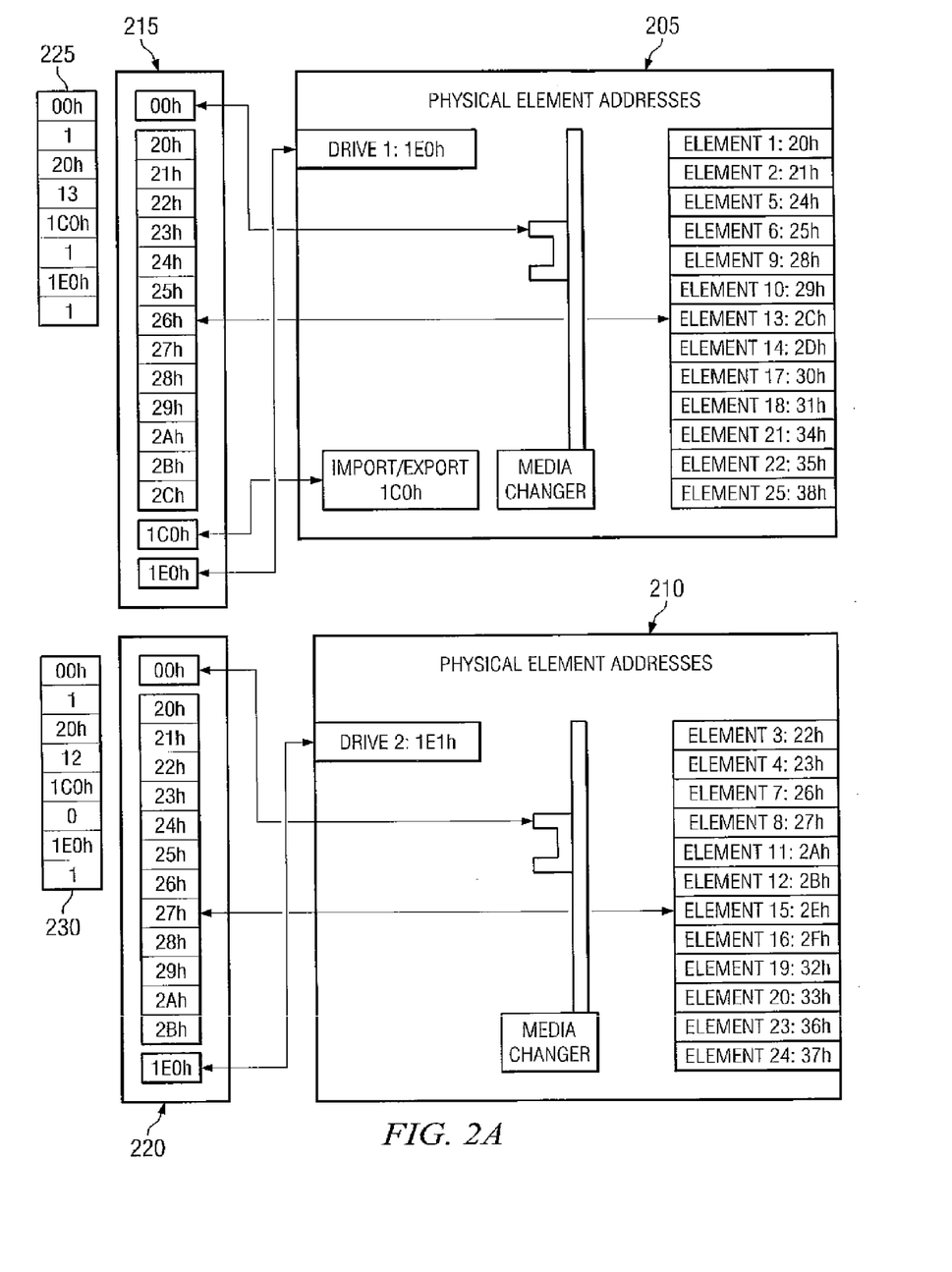
FIGS. 2A and 2B provide diagrammatic representations of mapping between physical and logical addresses.

FIG. 2 is a diagrammatic representation of physical-to-logical element address mapping at a controller according to one embodiment of the present invention. For simplicity, the example Partition 1 and Partition 2 discussed in conjunction with FIG. 1 are used. Partition 1 is assigned a set of physical elements (represented at 205) with the medium transport element having a physical element address of 00h, storage elements having physical element addresses of 20h-21h, 24h-25h, 28h-29h, 2Ch-2Dh, 30h-31h, 34h-35h and 38h, the import export element having a physical element address of 1C0h and the data transfer element having a physical element address of 1E0h. Partition 2 is assigned physical elements (represented at 210) with the medium transport element having a physical element address of 00h, the storage elements having physical element addresses of 22h-23h, 26h-27h, 2Ah-2Bh, 2Eh-2Fh, 32h-33h, and 36h-37h, and the data transfer element having a physical element address of 1E1h.

The physical element addresses for each partition can be mapped to an initial set of corresponding logical element addresses established by the administrator or controller. The initial set of corresponding logical addresses (represented at 215 for Partition 1 and 220 for Partition 2) can be established by an administrator or by the controller. In this example, the set of initial logical addresses for Partition 1 are 00h for the medium transport element, 20h-2Ch for the storage elements, 1C0h for the import/export element and 1E0h for the data transfer element. The set of initial logical addresses for Partition 2 are 00h for the medium transport element, 20h-2Bh for the storage elements and 1E0h for the data transfer element. A base logical element address of 1C0h can still be associated with import/export elements even though no import/export elements are assigned to Partition 2. The controller can optionally maintain an EAA page for each partition (e.g., EM page 225 for Partition 1 and EM page 230 for Partition 2) to respond to MODE SENSE commands.

According to one embodiment of the present invention, each library partition is made available to host applications on a different LUN. If only a particular host application has access to a library partition, then only that host application will see the library partition as being available on that LUN when the host application performs discovery. If a host application with access to a particular partition requests an EAA page, the controller can return the EAA page based on the initial set of logical element addresses for that partition (e.g., EAA page 225 for Partition 1) that can include, for example, the data of Table 4.

Figure 2B:
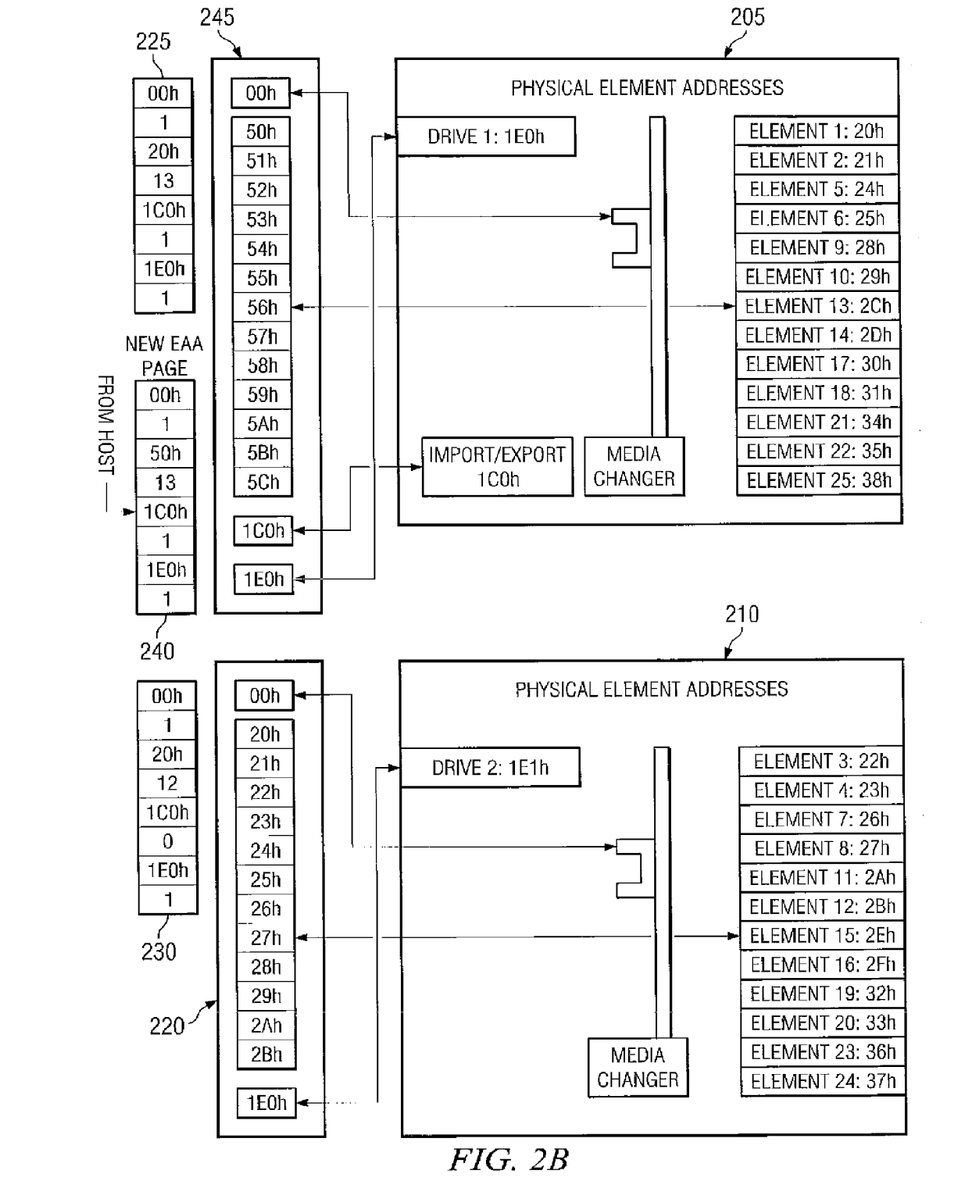

Referring to FIG. 2B, if the host application with access to Partition 1 wishes to change the addresses of the elements assigned to it, it can issue a MODE SELECT command containing a new EAA page (e.g., EAA page 240) that includes the desired starting address for each element type. The controller can then update the logical base address for each element type in that partition with the corresponding starting address for that element type in the EAA page. This results in an assigned set of new logical element addresses (represented at 245) for Partition 1. Future commands with respect to Partition 1 from that host application will have the assigned logical element address for an element mapped to the physical address rather than the initial logical element address.

Data provided to the controller in a MODE SELECT EAA page can be stored in a data structure (table or other data structure) that can allow controller 200 to determine the assigned logical element addresses for a library partition. The data structure can hold data for multiple host applications and/or partitions. When logical element address have been assigned based on a MODE SELECT EAA page, the controller can map directly between the assigned logical element addresses and the corresponding physical element addresses without using the initial logical element addresses for that partition. Although mapping is discussed in terms of mapping physical element addresses to contiguous logical element addresses, as described in the Contiguous Element Address Application, other mechanisms for mapping between physical and logical element addresses can be implemented.

It should be noted that the controller, according to one embodiment of the present invention, does not constantly maintain the logical element addresses for each partition, but instead uses an index associated with the physical element addresses and a base logical address for each element type to map between physical and logical element addresses as needed. Other embodiments of the present invention can maintain mappings according to other schemes.

Figure 3:
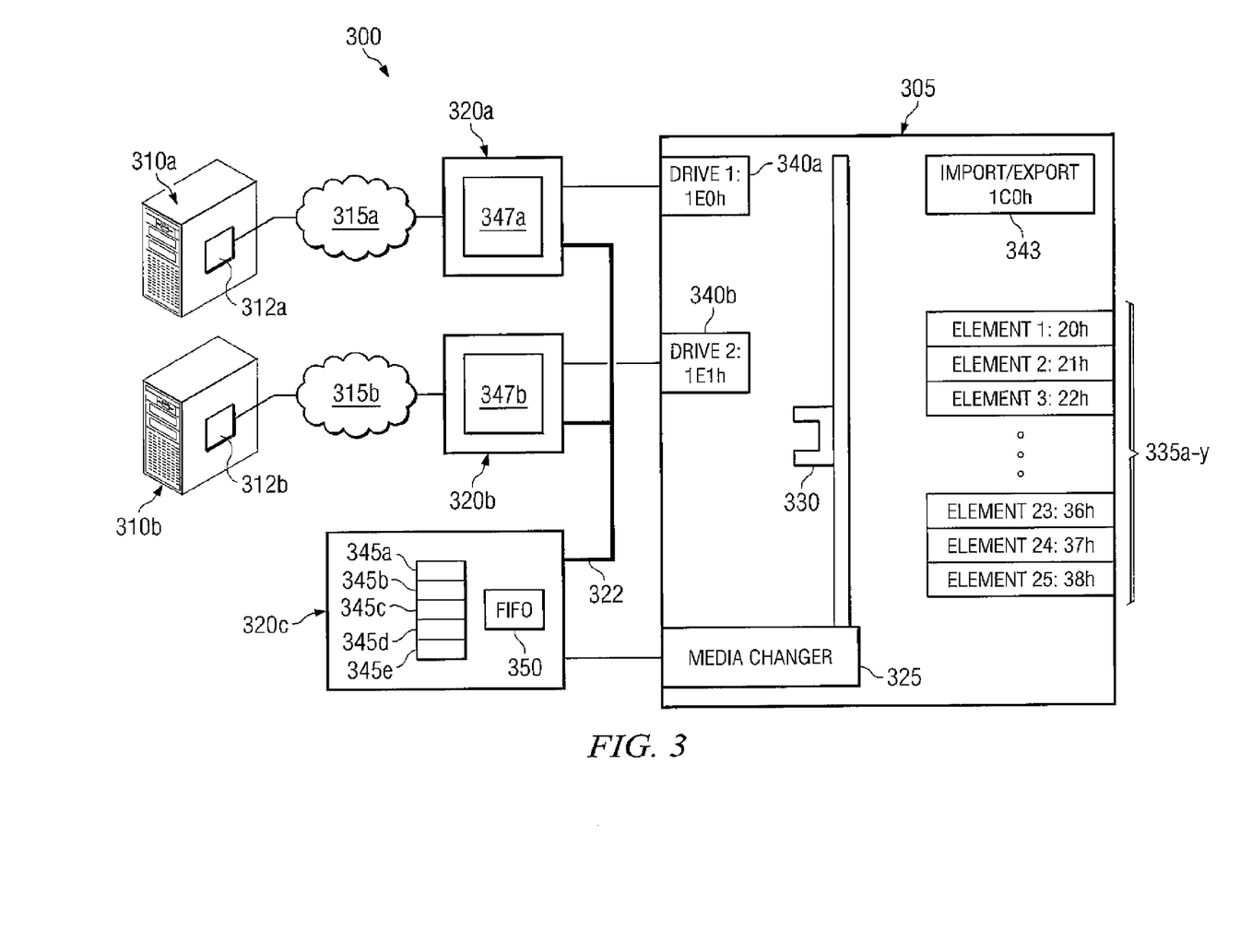
FIG. 3 is a diagrammatic representation of an embodiment of a system to provide centralized or distributed mapping between logical and physical element addresses in which embodiments of the present invention can be implemented.

In the example of FIG. 1, a physical media library is accessed through a single controller. According to other embodiments of the present invention, a physical media library can be accessed through multiple controllers. FIG. 3 is a diagrammatic representation of a system 300 in which a number of hosts have access to a media library 305 through various data transport media according to one embodiment of the present invention. In this embodiment, host 310a is connected to media library 305 via network 315a and controller 320a and host 310b is connected to media library 305 via network 315b and controller 320b. Each host can run one or more host applications (represented by host application 312a-b) configured to access a media library. Additionally, multiple hosts can be connected to media library 305 via the same network 315 and controller 320. Networks 315a-b, according to one embodiment of the present invention, can be a storage area networks ("SAN"), operating according to any data communication protocol known in the art, including SCSI, iSCSI, Fibre Channel, serial attached SCSI ("SAS"), advanced technology attachment ("ATA"), Serial ATA or other protocol known in the art. In other embodiments of the present invention, each network 315 can be the Internet, a LAN, a WAN, a wireless network or any other communications network known in the art. Media library 305 can communicate with each controller 320 according protocols including, but not limited to, SCSI, iSCSI, Fibre Channel, SAS, ATA, Serial ATA or other protocol known in the art. Controllers 320 can also communicate with each other via a control network 322 that can operate according any protocol known in the art.

Each controller 320 can include, for example, one or more communications interfaces to connect to media library 305 and to one or more other data transport media, such as a network (e.g., a SAN and/or a control network), processors and computer readable memories (RAM, ROM, magnetic disk, optical disk and/or other computer readable memory known in the art) that can store software instructions. The software instructions can be executable to control access by hosts on the respective data transport medium (e.g., network 315) to media library 305. Each controller, according to one embodiment of the present invention, can comprise a storage router.

Media library 305 can include media changer 325 with an associated medium transport element 330 (alternatively referred to as a "robot" or "picker"), multiple storage elements 335 (in this case, storage elements 335a-y) that can store storage volumes (e.g., tape cartridges, optical disks), data transfer elements (drives) 340a-b and one or more load (import/export) elements 343. The media changer 325 can control medium transport element 330. Medium transport element 330 physically moves storage volumes from one element to another.

For the sake of simplicity, it is assumed that media library 305 uses the same physical element addresses as media library 110 of FIG. 1. Media library 305 can be represented to host applications 312a and 312b as one or more partitions. When a host application searches a network for available media libraries, the controller controlling access to the media library for that host can make a media library partition available to the host application that represents a portion or all of a larger media library.

According to one embodiment, multiple media library partitions can be maintained by controller 320c for hosts. For example, controller 320c can maintain media library partition 345a for host 310a and media library partition 345b for host 310b. Each media library partition represents a host application's view of media library 305. For the sake of simplicity, it is assumed that partition 345a uses the same logical element addresses as Partition 1 from FIG. 1 and partition 345b uses the same logical element addresses as Partition 2 from FIG. 1. The media library partitions can be maintained as mapping logic and one or more tables or according to any storage scheme known in the art.

Each controller 320a-b can include software programming (represented by 347a-b) to present the media library partitions to the associated host application. Each controller 320a-b can maintain all the information for the appropriate media library partitions or only the information necessary to present the media library partition to a host and map commands to the appropriate data transfer element. For example, controller 320a may only include enough information to present media library partition 345a to host application 312a and forward commands to drive 340a and responses to host application 312a.

Each partition can include logical element addresses for the medium transport element, data transfer elements, storage elements and import/export elements assigned to that partition. Additionally, each partition can include logical network addresses or other data transport medium address for the data transfer elements and media changer. For example, if data transfer element 340a is at physical LUN 2, media library partition 345a can map this to logical LUN 3. Similarly, if media changer 325 is at physical LUN 0, it can be mapped, for example to logical LUN 1 for partition 345a and LUN 2 for partition 345b.

When host application 312a performs discovery on network 315a to find available media libraries, controller 320a can present media library partition 345a showing a data transfer element to logical LUN 3 and a media changer at logical LUN 1. Additionally, media library partition can have logical element addresses for storage elements, data transfer element 340a, medium transport element 330 and import/export element 343 as discussed above. If media library 305 is a tape library, host application 312a will consequently see an available tape library with one drive at LUN 3, having an element address of 1E0h, a media changer at LUN 1, thirteen cartridge slots with element addresses of 20h-2Ch, and an import/export element with an element address of 1C0h.

For commands directed to a data transfer element, a controller can forward the command to the appropriate data transfer element. For example, if media library partition 345a is presented to host application 312a, controller 320a can maintain at least the mapping between LUN 2 and LUN 3 such that if controller 320a receives a command directed to LUN 3, it can map the command to LUN 2 and forward the command to drive 340a. Additionally, controller 320a can perform any additional processing of the command depending on implementation.

For commands directed to media changer 325 (e.g., directed to logical LUN 1), on the other hand, the controller receiving the command (e.g., controller 320a) can forward the command to the controller connected to media changer 325 (e.g., controller 320c). If, for example, host application 312a wishes to move a tape cartridge from storage element 335d (i.e., the storage element at physical address 24h) to data transfer element 340a (i.e., the data transfer element at physical address 1E0h), it will issue a MOVE MEDIUM command to LUN 1, referencing logical storage element address 22h and logical data transfer element address 1E0h. Because the command is directed to LUN 1, controller 320a can forward the command to controller 320c.

Controller 320c, in turn, can map the logical data transport medium address to which the command is directed and the logical element addresses referenced by the command to the physical counterparts of media library 305. Thus, for example, controller 320c can map the command received from controller 320a to LUN 0, map logical element address 22h to physical element address 24h, and map logical element address 1E0h to physical element address 1E0h. Controller 320c therefore modifies the MOVE MEDIUM command to reference physical element addresses 24h and 1E0h and forwards the command to the media changer at LUN 0. Consequently, the command issued by host application 312a to LUN 1 to move a storage volume from the storage element address 22h to the data transfer element at element address 1E0h will be mapped to media changer 325 at LUN 0 to move the storage volume from the physical storage element address 24h to the data transfer element at physical element address 1E0h.

In one embodiment, MODE SELECT commands issued to media changer 325 are also passed to controller 320c. Thus, for example, if host application 312a sends a MODE SELECT EAA page to controller 320a, controller 320a can forward the command to controller 320c. Controller 320c can update the mappings between physical and logical element addresses for Partition 1 based on the EAA page. Thus, in a centralized media library partitioning scheme, controller 320c can act similar to controller 107 of FIG. 1.

According to another embodiment, each controller 320a-320b can perform the logical to physical mapping of element addresses for hosts. The commands using the physical element addresses can then be forwarded to controller 320c for forwarding to media changer 325. In this case, each of controller 320a-320b can maintain sufficient logic to perform mappings between physical and logical element addresses for all hosts or the hosts that access media library 305 through that particular controller. In this case, processing related to physical-to-logical mappings is distributed among controllers 320a and 320b (e.g., controller 320a performs mapping for commands from host application 312a and controller 320b performs mapping for commands from host application 312b).

For MODE SELECT commands with EAA pages directed to media changer 325, the controller that performs the logical-to-physical mapping of element addresses for the issuing host application can update the logical element addresses based on the EAA page. For a MODE SELECT command from host application 312a with an EAA page, for example, controller 320a can update the logical element addresses for Partition 1 based on the EAA page. Controller 320a can then use the assigned logical element addresses when translating commands for media changer 325 and responses to host application 312a.

Configuration of library partitions can be performed by, for example, a library administrator. The library administrator can configure one of the controllers 320, such as controller 320c, with the library partitions. Configuration can be performed via a graphical, control line or other interface using a library control application. In yet another embodiment of the present invention, configuration can be performed using a library control application (e.g., StorageWorks Command View) residing on an administrative computer. The administrative computer can be connected to controllers 320a-c via control network 322. The library partitions can be uploaded from the administrative computer to controller 320c and/or controllers 320a-b. If information is uploaded to only controller 320c, controller 320c can be responsible for sending any information necessary to controllers 320a-b to perform centralized or distributed mapping.

It should be noted that in many media libraries there is only one or a limited number of robots. Therefore, a media changer (e.g., media changer 325) can not handle concurrent commands or may only handle a few concurrent commands. Controller 320c, on the other hand, may receive many commands directed to media changer 325 from controllers 320a-b. Controller 320c can, therefore, prioritize commands to media changer 325. According to one embodiment of the present invention, controller 320e can maintain a FIFO buffer 350 for commands directed to media changer 325. In other embodiments of the present invention, other prioritization schemes can be employed, such as giving priority to commands from a particular other controller 320. Thus, controller 320c acts to serialize commands directed to media changer 325. The decision as to whether to respond to a status command with cached status information or to pass the command to the media changer can be based, for example, on the number and types of commands in FIFO 350. It should be noted that controller 320c can also interface with one or more data transfer elements and receive commands directly from hosts.

Figure 4:
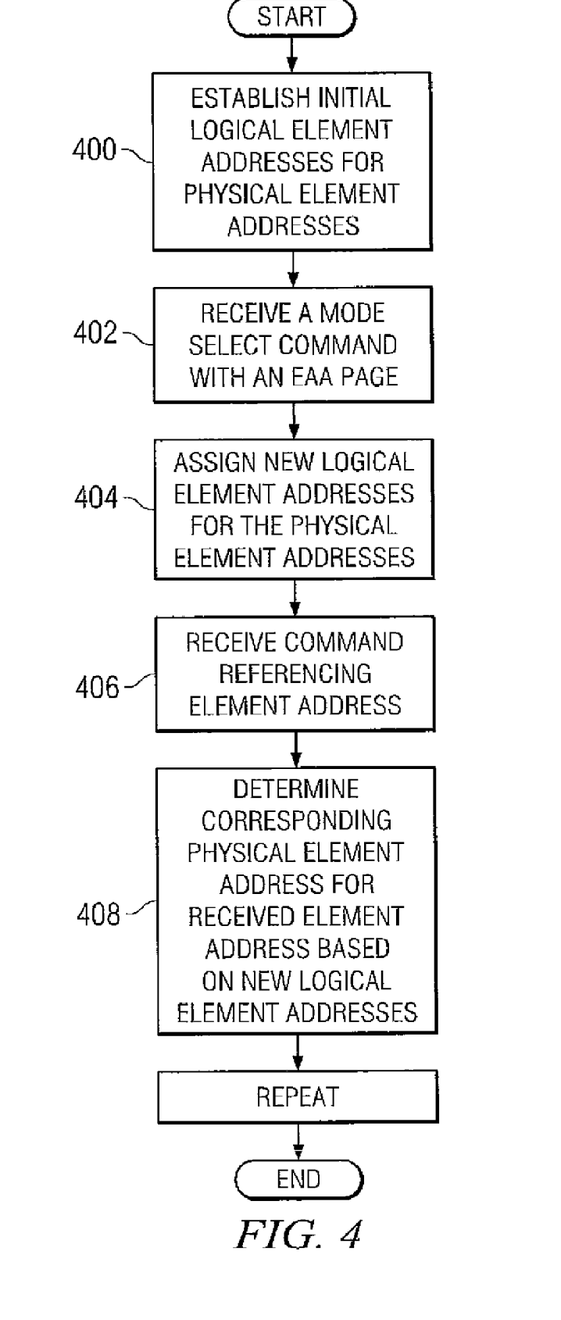
FIG. 4 is a flow chart illustrating one embodiment of a method for handling MODE SELECT commands.

FIG. 4 is a flow diagram illustrating one embodiment of a method for MODE SELECT handling. At step 400, a set of initial logical element addresses corresponding to a set of physical element addresses for a library partition can be established. According to one embodiment of the present invention, the physical element addresses for a library partition can be provided to a controller by a configuration program (e.g., StorageWorks Command View). The controller can then establish the initial logical element addresses according to the Contiguous Element Address Application or other mechanism. According to other embodiments of the present invention, both the physical element addresses and corresponding initial logical element addresses can be provided by a configuration program.

At step 402 the controller can receive a command (e.g., a MODE SELECT) from an issuing host application. In response to the command, the controller, at step 404, assigns a set of new logical element addresses for the physical element addresses, replacing the set of initial logical element addresses. The new logical element addresses can be based on an EAA page received with the MODE SELECT command. According to one embodiment, the controller can assign a new base logical element address for an element type based on the starting address for that element type specified in the EAA page. The new logical element address for a particular physical element address can then be determined by adding an index value associated with that physical element address to the new base logical element address.

Using the new logical element addresses, the controller can map commands received from the host application to the corresponding physical element addresses. If, at step 406, the controller receives a command containing an element address, the controller can determine, at step 408, the corresponding physical element address based on the set of new logical element addresses. According to one embodiment, this can be done by subtracting the new base logical element address for the element type from the received element address to determine an index value associated with the corresponding physical element address. The controller can then determine the corresponding physical element address based on the index value using, for example, a lookup table.

It should be noted that other mechanism for mapping between logical and physical element addresses developed in the art can be employed. It should be further noted that the methodology of FIG. 4 can be implemented as a set of computer executable instructions stored on a computer readable medium that are executable by one or more processors. The computer executable instructions can programmed in any suitable programming language according to any suitable programming architecture. The steps of FIG. 4 can be arbitrarily repeated as needed or desired.

Figure 5A:
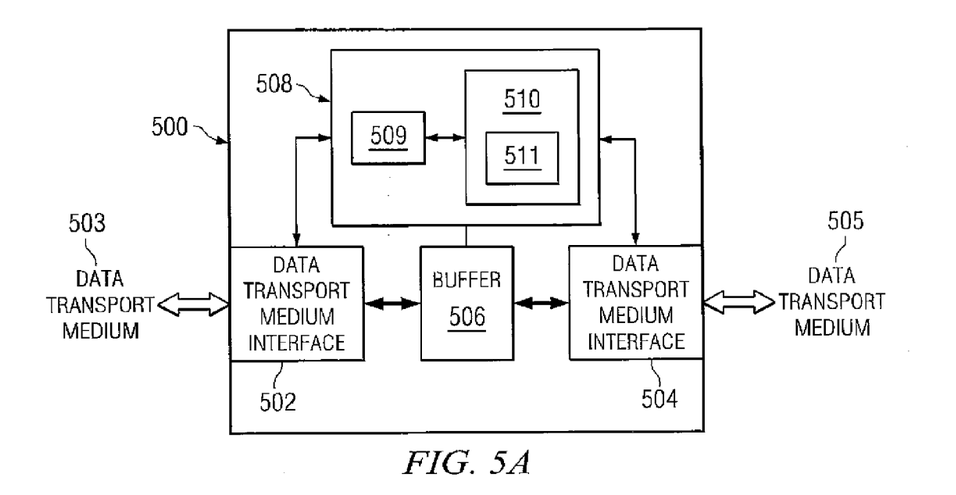
FIGS. 5A and 5B are diagrammatic representations of a controller according to one embodiment of the present invention.

FIG. 5A is a diagrammatic representation of one embodiment of a controller 500 according to the present invention. In the example of FIG. 5A, controller 500 is a storage routing device. Controller 500 can comprise a first transport medium interface 502 that interfaces with a first transport medium 503 and a second transport medium interface 504 that interfaces with a second transport medium 505. In one embodiment of the present invention, the first transport medium 503 can be a Fibre Channel transport medium, the second transport medium 505a SCSI bus, interface 502a Fibre Channel controller, such as a fibre channel controller based on the TACHYON family of fibre channel control chips and interface 504a SCSI controller. TACHYON fibre channel control chips are a product Agilent Technologies, Inc. of Palo Alto, Calif. Various forms of the Tachyon fibre channel control chip can be used including, but not limited to, the TL or Tachlite (HPFC-5100), the XL2 (HPFC-5200x, where x is the Rev A, B, C, etc.), the DX2 (HPFC-5500x, where x is the Rev A, B, C, etc.), the DX4 (HPFC-5700x, where x is the Rev A, B, C, etc.).

In other embodiments of the present invention the first and second transport media (and respective controllers) can be: Fibre Channel and Fibre Channel; SCSI and SCSI; iSCSI and iSCSI; Fibre Channel and iSCSI; iSCSI and Fibre Channel; iSCSI and SCSI; SCSI and iSCSI; Fibre Channel and Infiniband; Infiniband and Fibre Channel; iSCSI and ATA; ATA and iSCSI; iSCSI and Serial ATA; Serial ATA and iSCSI; Fibre Channel and Serial Attached SCSI; Serial Attached SCSI and Fibre Channel; iSCSI and Serial Attached SCSI; Serial Attached SCSI and iSCSI; Fibre Channel and ATA; ATA and Fibre Channel; Fibre Channel and Serial ATA; Fibre Channel and Fibre Advanced Technology Attachment ("FATA"); Serial ATA and Fibre Channel; Fibre Channel and Serial SCSI Architecture; Serial SCSI Architecture and Fibre Channel; Infiniband and Serial Attached SCSI; Serial Attached SCSI and Infiniband. Moreover, the transport media can operate according to other protocols.

A buffer 506 provides memory work space and is connected to both interface 502 and to interface 504. Buffer 506 can be located remotely from routing device 500 and can also comprise multiple buffers. A processing unit 508 can be connected to interface 502, interface 504 and buffer 506. According to one embodiment of the present invention, processing unit 508 comprises one or more processors 509 for controlling operation of controller 500 and a computer readable medium 510 accessible by the processor storing a set of computer instructions 511 that are executable by the processor. The computer readable medium can include one or more of RAM, ROM, Flash memory, magnetic disk or other storage medium known in the art. According to other embodiments of the present invention buffer 506 and/or computer readable medium 511 can be onboard processor 510.

In one implementation (not shown), the controller 500 can be a rack mount or free standing device with an internal power supply. Controller 500 can have a Fibre Channel and SCSI port, and a standard, detachable power cord can be used, the FC connector can be an optical Small Form Factor ("SFF") connector, and the SCSI connector can be a VHDCI type. Additional modular jacks can be provided for a serial port and an 802.3 10BaseT port, i.e. twisted pair Ethernet, for management access. The SCSI port of the controller 500 can support SCSI direct and sequential access target devices and can support SCSI initiators, as well. The Fibre Channel port can interface to fibre channel enabled devices and initiators or other Fibre Channel devices.

To accomplish its functionality, one implementation of the routing device uses: a Fibre Channel interface based on the Agilent XL2 2 Gb/s Fibre Channel controller and an optical SFF transceiver; a PMCS RM7000A processor, incorporating independent data and program memory spaces, and associated logic required to implement a stand alone processing system; and a serial port for debug and system configuration. Further, this implementation includes a SCSI interface supporting Ultra-2 based on the SYMBIOS 53C8xx series SCSI controllers, and an operating system based upon the WIND RIVERS SYSTEMS VXWORKS kernel. In addition, the routing device can include software as required to control functions of the various elements, present library partitions, map between logical and physical addresses, respond to status commands, generate commands and provide appropriate translations between the FC and SCSI data transport protocols (or other protocols if necessary for other embodiments).

Figure 5B:
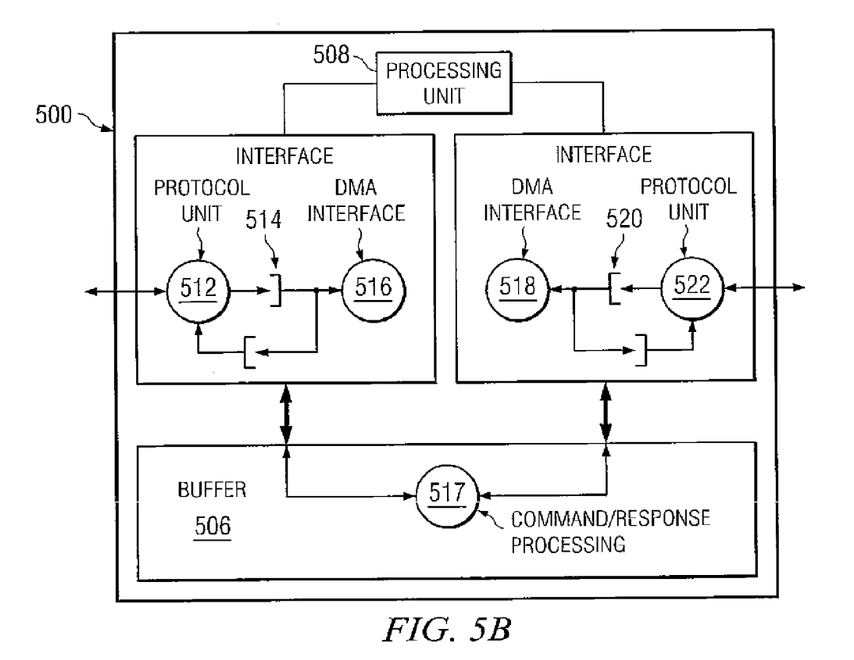

FIG. 5B is a block diagram of one embodiment of data flow within the controller 500 of FIG. 5A. As shown, data from first transport medium 503 (e.g., the Fibre Channel transport medium) is processed by a protocol unit 512 (e.g., a Fibre Channel protocol unit) and placed in a FIFO queue 514. A direct memory access (DMA) interface 516 can then take data out of FIFO queue 514 and places it in buffer 506. Buffer 506 can, itself, act as a FIFO buffer for commands direct to a media library for multiple hosts and provide a memory space to cache status information.

Processing unit 508 processes the data in buffer 506 as represented by processing 517. This processing can include mapping between physical and logical addresses for elements of a media library, updating the physical-to-logical mappings based on a MODE SELECT command received from a host application and other processing. A DMA interface 518 then pulls data from buffer 506 and places it into a buffer 520. A second protocol unit 522 pulls data from buffer 520 and communicates the data on the second transport medium 505 (e.g., the SCSI bus). Data flow in the reverse direction, from the second data transport medium 505 to the first data transport medium 503, can be accomplished in a reverse manner.

It should be noted that the example of the controller of FIGS. 5A and 5B is provided by way of example. Embodiments of the present invention can be implemented in devices such as storage routing devices or other devices. Additionally, embodiments of the present invention can be implemented has hardware and/or software programming. Embodiments can be implemented through execution of computer instructions stored on any computer readable medium known in the art (e.g., optical disk, magnetic disk, flash memory, RAM, ROM, EEPROM or other computer readable medium).

Figure 6:
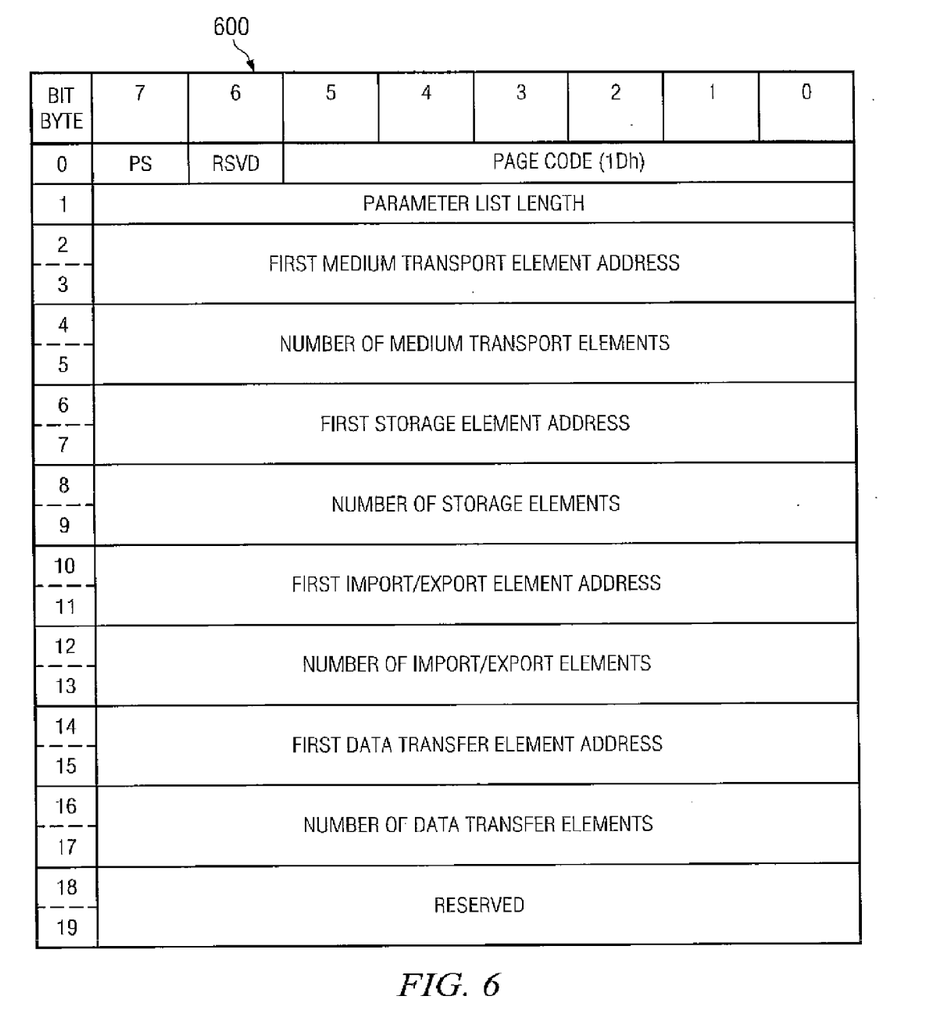
FIG. 6 is a diagrammatic representation of one embodiment of an element address assignment ("EAA") page.

FIG. 6 is a diagrammatic representation of one embodiment of an EAA page 600 (e.g., a 0x1D page). For each element type, the EAA page includes the starting address for the element type and the number of elements of that type. Using the example of FIG. 1, the MODE SENSE page for Partition 1 will include the information of Table 4, while the MODE SENSE page for Partition 2 will include the information of Table 5.

Although the present invention has been described in detail herein with reference to the illustrated embodiments, it should be understood that the description is by way of example only and is not to be construed in a limiting sense. It is to be further understood, therefore, that numerous changes in the details of the embodiment of this invention and additional embodiments of this invention will be apparent, and may be made by, persons of ordinary skill in the art having reference to this description. It is contemplated that all such changes and additional embodiments are within scope of the invention as claimed below.

What is claimed is:

1. A system operable to handle status commands directed to a media library partition, comprising:
    a set of one or more hosts;
    a media library comprising a plurality of elements of different element types, the plurality of elements including:
        a plurality of data storage elements;
        one or more data transfer elements;
        one or more medium transport elements; and
    a controller physically remote from the one or more hosts and the media library and coupled to one or more elements of the media library through a first data transport medium, the controller operable to:
        present a library partition to each host as a virtual media library wherein each virtual media library comprises logical element addresses representing physical element addresses for: one or more medium transport element(s), one or more data transfer element(s) and one or more data storage element(s);
        receive a first command sent over a network from a first host specifying one or more element addresses for a first virtual media library presented to the first host;
        assign new logical element addresses to represent physical element addresses in response to the first command and in accordance with the one or more element addresses specified by the first command;
        receive a second command sent over the network from the first host specifying an element address; and
        determine a corresponding physical address for the element address specified by the second command based on the new logical element addresses.

2. The system of claim 1, wherein the first command is a MODE SELECT command.

3. The system of claim 2, wherein the MODE SELECT command includes an element address assignment ("EAA") page.

4. The system of claim 3, wherein the controller is further operable to:
    assign a new base logical element address for an element type based on a starting address for that element type in the EAA page; and
    determine a new logical element address for a particular physical element address by adding an index value associated with that physical element address to the new base logical element address for the element type.

5. The system of claim 4, wherein the controller is further operable to:
    subtract the new base logical address from the element address specified by the second command to determine an index value associated with the corresponding physical element address; and
    determine the corresponding physical element address using the index value associated with the corresponding physical element address.

6. The system of claim 1, wherein the controller is further operable to return an EAA page based on the set of new logical element addresses in response to a MODE SENSE command from a host.

7. A method for handling status commands directed to a partitioned media library comprising:
    at a controller remote from a set of hosts and a media library:
        presenting a library partition to each host as a virtual media library wherein each virtual media library comprises logical element addresses representing physical element addresses for: one or more medium transport element(s), one or more data transfer element(s) and one or more data storage element(s);
        receiving a first command sent over a network from a first host specifying one or more element addresses for a first virtual media library presented to the first host;
        assigning new logical element addresses to represent physical element addresses in response to the first command and in accordance with the one or more element addresses specified by the first command;
        receiving a second command sent over the network from the first host specifying an element address; and determining a corresponding physical address for the element address specified by the second command based on the new logical element addresses.

8. The method of claim 7, wherein the first command is a MODE SELECT command.

9. The method of claim 8, wherein the MODE SELECT command includes an element address assignment ("EAA") page.

10. The method of claim 9, wherein assigning new logical element addresses further comprises:
assigning a new base logical element address for an element type based on a starting address for that element type in the EAA page; and
determining a new logical element address for a particular physical element address by adding an index value associated with that physical element address to the new base logical element address for the element type.

11. The method of claim 10, wherein determining the corresponding physical element address for the element address specified by the second command further comprises:
subtracting the new base logical address from the element address specified by the second command to determine an Index value associated with the corresponding physical element address; and
determining the corresponding physical element address using the index value associated with the corresponding physical element address.

12. The method of claim 7, further comprising:
receiving a MODE SENSE command requesting an element address assignment ("EAA") page; and
returning the EAA page using the new logical element addresses.

13. A computer program product comprising a set of computer instructions stored on a computer readable medium, said set of computer instructions comprising instructions executable at a controller remote from a set of hosts and a media library to:
at the controller:
present a library partition to each host as a virtual media library wherein each virtual media library comprises logical element addresses representing physical element addresses for: one or more medium transport element(s), one or more data transfer element(s) and one or more data storage element(s);
receive a first command sent over a network from a first host specifying one or more element addresses for a first virtual media library presented to the first host;
assign new logical element addresses to represent physical element addresses in response to the first command and in accordance with the one or more element addresses specified by the first command;
receive a second command sent over the network from the first host specifying an element address; and
determine a corresponding physical address for the element address specified by the second command based on the new logical element addresses.

14. The computer program product of claim 13, wherein the first command is a MODE SELECT command.

15. The computer program product of claim 14, wherein the MODE SELECT command includes an element address assignment ("EAA") page.

16. The computer program product of claim 15, wherein the instructions executable to assign new logical element addresses further comprise instructions executable to:
assign a new base logical element address for an element type based on a starting address for that element type in the EAA page; and
determine a new logical element address for a particular physical element address by adding an index value associated with that physical element address to the new base logical element address for the element type.

17. The computer program product of claim 16, wherein the instructions executable to determine the corresponding physical element address for the element address specified by the second command further comprise instructions executable to:
subtract the new base logical address from the element address specified by the second command to determine an index value associated with the corresponding physical element address; and
determine the corresponding physical element address using the index value associated with the corresponding physical element address.

18. The computer program product of claim 13, wherein said set of computer instructions further comprise instructions executable to return an EAA page based on the new logical element addresses in response to a MODE SENSE command from a host.

* * * * *